US010679539B2

(12) United States Patent
Chui et al.

(10) Patent No.: US 10,679,539 B2
(45) Date of Patent: Jun. 9, 2020

(54) TWO-DIMENSIONAL COMPOSITING

(71) Applicant: Outward, Inc., San Jose, CA (US)

(72) Inventors: Clarence Chui, Los Altos Hills, CA (US); Christopher Murphy, San Jose, CA (US)

(73) Assignee: Outward, Inc., San Jose, CA (US)

( * ) Notice: Subject to any disclaimer, the term of this patent is extended or adjusted under 35 U.S.C. 154(b) by 69 days.

(21) Appl. No.: 15/674,448

(22) Filed: Aug. 10, 2017

(65) Prior Publication Data

US 2019/0051037 A1 Feb. 14, 2019

(51) Int. Cl.
G09G 3/20 (2006.01)
G06T 15/04 (2011.01)
G09G 5/36 (2006.01)
G06T 11/40 (2006.01)

(52) U.S. Cl.
CPC ............... G09G 3/20 (2013.01); G06T 11/40 (2013.01); G06T 15/04 (2013.01); G09G 5/363 (2013.01); G09G 2370/022 (2013.01)

(58) Field of Classification Search
None
See application file for complete search history.

(56) References Cited

U.S. PATENT DOCUMENTS

| | | | | |
|---|---|---|---|---|
| 7,457,962 B2* | 11/2008 | Moskowitz | ........... | G06T 1/0028 713/176 |
| 9,355,487 B2* | 5/2016 | Moll | ........ | G06T 13/20 |
| 9,472,161 B1* | 10/2016 | Ho | .......... | G09G 5/02 |
| 2007/0177433 A1* | 8/2007 | Poirier | ............ | G11B 20/00086 365/189.05 |
| 2009/0153577 A1* | 6/2009 | Ghyme | ................... | G06T 15/04 345/582 |
| 2009/0190858 A1* | 7/2009 | Moody | ................... | G06T 11/60 382/276 |
| 2010/0053172 A1 | 3/2010 | Derose | | |
| 2010/0194768 A1* | 8/2010 | Schrag | .................... | G06T 15/04 345/584 |
| 2012/0081357 A1* | 4/2012 | Habbecke | ............... | G06T 17/00 345/419 |
| 2013/0257888 A1* | 10/2013 | Behrens | .................. | G06T 11/40 345/589 |
| 2013/0304604 A1 | 11/2013 | Hoffman | | |
| 2015/0066189 A1* | 3/2015 | Mulligan | ............ | G06F 3/04815 700/136 |
| 2015/0100145 A1* | 4/2015 | Selvarajan | .............. | G06T 15/04 700/98 |
| 2015/0254903 A1* | 9/2015 | Sumner | ................. | G06T 19/006 345/420 |
| 2017/0053442 A1* | 2/2017 | Sumner | ................. | G06T 19/006 |

* cited by examiner

*Primary Examiner* — Jason A Pringle-Parker
(74) *Attorney, Agent, or Firm* — Van Pelt, Yi & James LLP

(57) ABSTRACT

Two-dimensional compositing that preserves the curvatures of non-flat surfaces is disclosed. In some embodiments, a mapping is associated with a two-dimensional rendering that maps a potentially variable portion of the two-dimensional rendering to a canvas. The mapping is generated from a three-dimensional model of the potentially variable portion of the two-dimensional rendering. The potentially variable portion of the two-dimensional rendering is dynamically modified according to the mapping to reflect content comprising the canvas or edits received with respect to the canvas.

45 Claims, 5 Drawing Sheets

TWO-DIMENSIONAL COMPOSITING

BACKGROUND OF THE INVENTION

Typical two-dimensional compositing is limited to compositing on flat surfaces or alternatively fails to preserve the geometric properties of non-flat surfaces. Thus, improvements in two-dimensional compositing are needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Figure 1:
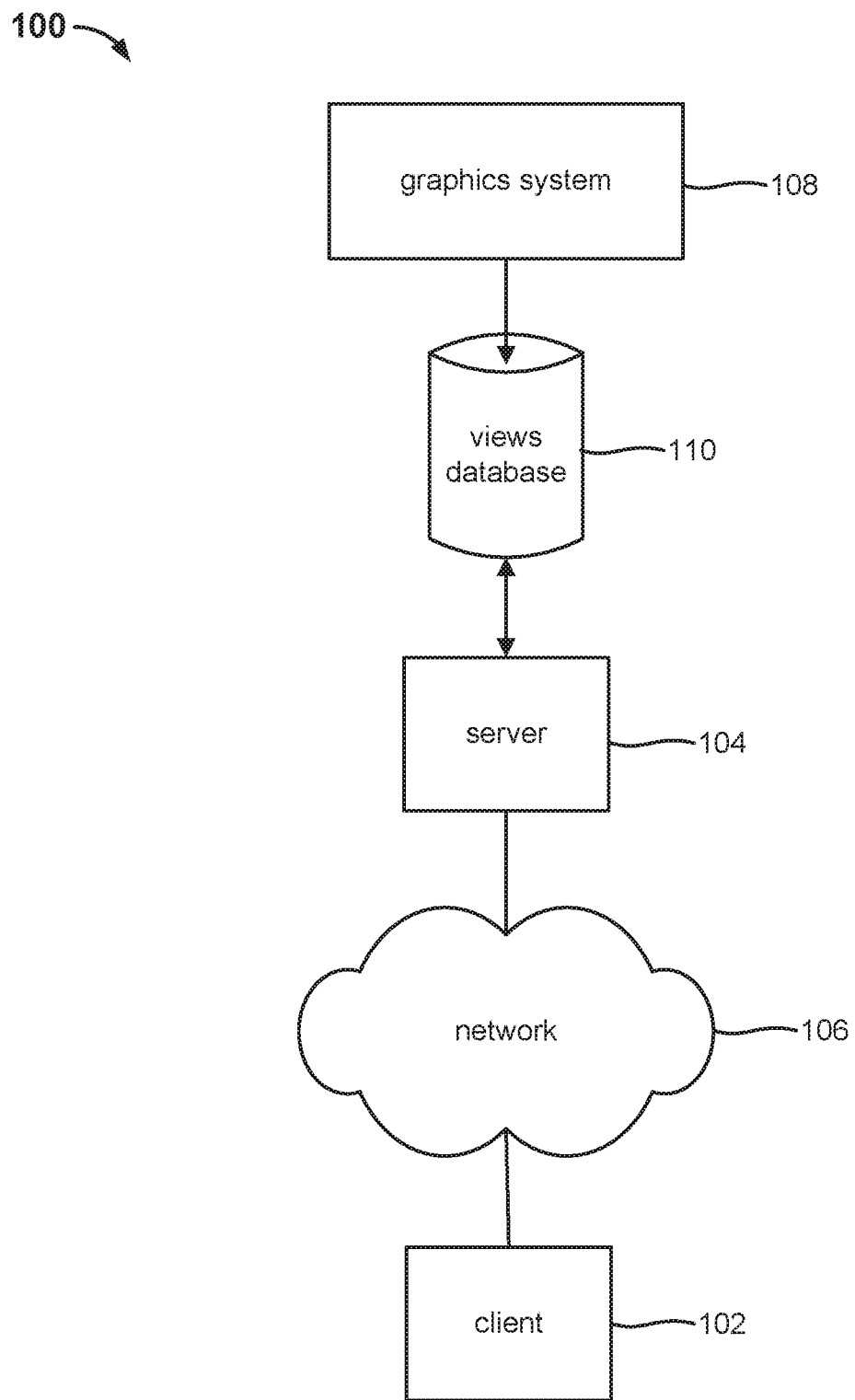
FIG. 1 is a high level block diagram illustrating an embodiment of a network environment for dynamically modifying a potential variable portion of a two-dimensional rendering based on a client-side specification of custom content.

FIG. 1 is a high level block diagram illustrating an embodiment of a network environment 100 for dynamically modifying a potentially variable portion of a two-dimensional rendering based on a client-side specification of custom content. In some embodiments, network environment 100 facilitates a client-server application. As depicted, network environment 100 comprises client 102 and server 104 components configured to communicate over network 106. Although depicted as single blocks, the various client-side and server-side components may comprise a plurality of possibly networked components. A network between components as well as network 106 may comprise any combination of one or more public and/or private, wired and/or wireless networks, such as a LAN, a WAN, the Internet, a cellular network, etc.

In the description herein, the terms "two-dimensional rendering" and "image" are used interchangeably and comprise a prescribed view or perspective of an object or a scene comprising a plurality of objects. The disclosed techniques are not limited to modifying two-dimensional renderings with custom content but can similarly be extended to three-dimensional scenes, e.g., for dynamically modifying a variable portion of a three-dimensional virtual reality environment.

As illustrated in FIG. 1, server-side components of network environment 100 include graphics system 108 that employs three-dimensional models to generate two-dimensional renderings that are stored in views database 110. Graphics system 108 may comprise any one or more appropriate components such as a modeling engine that generates three-dimensional polygon mesh models of objects or scenes and a rendering engine that generates two-dimensional renderings, i.e., images, from three-dimensional models. In some cases, for example, graphics system 108 may comprise one or more graphics processing units (GPUs) and employ a platform such as Open Graphics Library (OpenGL) to generate two-dimensional renderings.

In some embodiments, a plurality of images or views (e.g., from different perspectives, angles of rotation, camera positions or viewpoints, etc.) of a three-dimensional model of an object or a scene is rendered and stored in views database 110. For example, a plurality of views of an object or a scene may be pre-rendered so that an image can be efficiently retrieved and served by server 104 in response to a request for a prescribed view from client 102. In some cases, a curated set of views or perspectives is rendered and stored in views database 110. In such cases, an image served to a client may accordingly be constrained to the prescribed set of views available instead of any arbitrary view. However, the set of images of a given object or scene may be sufficiently dense to appear as if any arbitrary view or perspective of the object or scene may be requested from the client-side. In some embodiments, instead of or in addition to being populated from graphics system 108, views database 110 may at least in part be populated from one or more other, possibly external, third-party sources that provide two-dimensional renderings of various views of objects or scenes. In some embodiments, at least some of the renderings stored in views database 110 comprise photoreal images.

A portion of an image may be modified post rendering, for example, by dynamically compositing specified custom content. For example, a potentially variable portion of a two-dimensional rendering may be modified client-side. In some cases, a canvas that maps to the potentially variable portion is provided to a user of the client, and the user may add, remove, modify, and/or otherwise edit content on the canvas as desired. That is, the canvas is used to specify or generate custom content that is mapped to corresponding parts of the two-dimensional rendering. The canvas may conceptually be considered similar to a patch or decal that is applied to the image comprising the two-dimensional rendering. Blank or empty portions of the canvas that do not include any content comprise transparent pixels that do not modify the corresponding original pixels of the two-dimensional rendering. However, pixels comprising content included on the canvas replace the corresponding original pixels of the two-dimensional rendering. In some embodiments, modifications of the canvas dynamically or substantially simultaneously modify corresponding pixels of the two-dimensional rendering in real time so that a user can observe the manner in which modifications of the content on the canvas modify the two-dimensional rendering.

A mapping associated with a prescribed two-dimensional rendering specifies the manner in which pixels of a canvas map to corresponding pixels of the two-dimensional rendering. The mapping preserves the geometric properties of one or more surfaces comprising the potentially variable portion of the two-dimensional rendering such that physical fidelity of the surfaces (e.g., surface curvature) is maintained when original pixels are replaced by canvas pixels. As an example, consider that the two-dimensional rendering comprises an image of an item of clothing and that the canvas comprises embroidered letters that are monogrammed onto a portion of the item of clothing that includes one or more folds. In this example, the composited letters would curve according to the folds of the item of clothing. Thus, contours and curvatures of non-flat surfaces are preserved during compositing via such a mapping, which itself is derived from the underlying three-dimensional model(s) of the surfaces.

Generally, any appropriate mapping scheme may be employed such as projection mapping or texture mapping. An example of the latter comprises UV mapping. In such cases, the canvas comprises a spatially indexed (e.g., UV indexed) texture that paints corresponding pixels of the two-dimensional rendering according to the specified mapping that maps UV coordinates of the canvas to corresponding UV coordinates of the two-dimensional rendering. That is, the mapping effectively comprises a lookup table between the canvas and the rendering or image. As one example, for instance, the rows and columns of the lookup table comprise the U and V coordinates of the canvas, and cell values comprise corresponding UV coordinates of the two-dimensional rendering.

In some embodiments, a mapping between pixels of a canvas and pixels of a variable portion of a two-dimensional rendering is stored with the two-dimensional rendering or view in database 110 and served to a client with the rendering or view. Different views have different associated mappings. A mapping may be separately generated when a two-dimensional rendering or view is rendered from a corresponding three-dimensional model or may be generated from a three-dimensional model of a potentially variable portion of an existing two-dimensional rendering or view that is, for example, already stored in database 110. The mapping may be encoded server-side and later decoded client-side. In some embodiments, a mapping may itself be encoded as pixel values (e.g., RGB coordinates) and separately rendered as an image that is stored and served with a corresponding two-dimensional rendering or view with which it is associated.

Client 102 of network environment 100 comprises various client-side features and components. In some embodiments, client 102 includes a user interface via which various images or views of an object or a scene may be requested by a user of the client. In some embodiments, a default view of an object or a scene is initially provided to client 102 by server 104 from views database 110, e.g., in response to an indication of interest in the object or scene from a user of the client. The client-side user interface includes one or more controls for manipulating a view from the client-side. For example, the user interface may include transformation controls associated with translating, rotating, scaling (e.g., zooming in and zooming out), etc. In response to a selection of a particular view or a manipulation of an existing view at client 102, a request is sent to server 104, and server 104 responds to the request by sending to client 102 the closest available view from database 110. In some embodiments, the client-side controls may at least in part be constrained so that only curated views available in database 110 may be requested and received. However, pre-rendered images or views of an object or scene available in database 110 may be sufficiently dense such that it seems to the end user that the user has complete control over the currently displayed client-side view.

As previously described, the client-side user interface furthermore comprises a canvas for generating or specifying custom content. For example, a blank or empty canvas that does not include any content may initially be presented to a user via the client-side user interface when the user is presented with a new view or image. Alternatively, a canvas presented to a user may include automatically selected default content comprising recommended or suggested content or may include content previously specified by the user, e.g., with respect to a prior or different view or image. A user may add, remove, modify, and/or otherwise edit content on a presented canvas as desired. In some cases, the types of content that may be included on the canvas may at least in part be constrained. However, generally, any combination of content may be included on the canvas for which texture information is available or can be obtained client-side. In various embodiments, textures that can be added to the canvas may already exist at client 102 or obtained from server 104 or from another external source.

As one example, server 104 may provide to client 102 a font cell sheet for a stitched or embroidered font comprising a particular style and color; in this example, for instance, a user of client 102 may add any combination of letters from the font cell sheet to the canvas that, in turn, dynamically appear in real time as monogrammed letters on a displayed view at the client. As previously described, the canvas effectively comprises a spatially indexed texture image that includes user specified custom content that is composited on corresponding portions of a displayed image according to a mapping associated with the image that maps canvas pixels to corresponding pixels of the image in a manner that preserves the contours and curvatures of non-flat surfaces. Thus, flat canvas pixels that replace corresponding image pixels warp or curve in the same manner as the original image pixels and consequently preserve the physical fidelity of the corresponding surfaces. With respect to the aforementioned example, monogrammed letters composited on a fabric would curve or distort according to the contours or folds of the fabric. Empty pixels of the canvas that do not include any content comprise transparent pixels that do not replace corresponding pixels of the displayed image.

Figure 2:
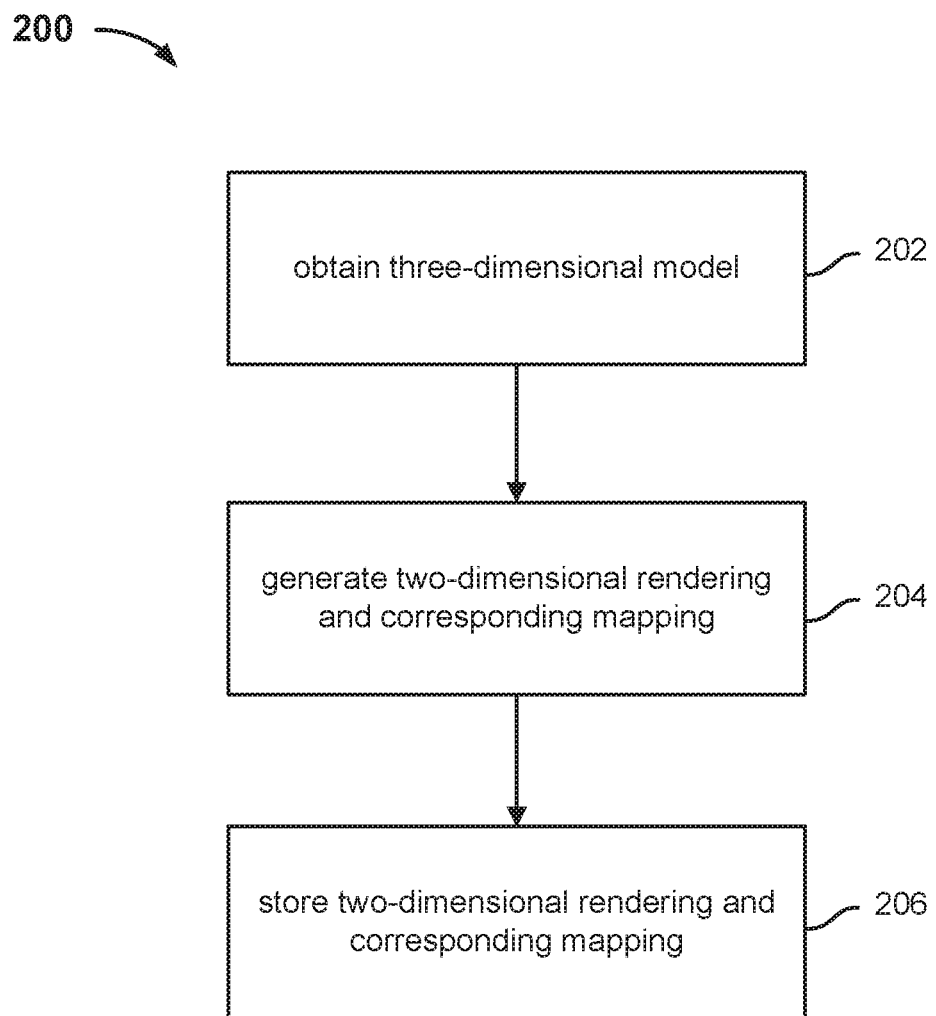
FIG. 2 is a high level flow chart illustrating an embodiment of a process for generating a two-dimensional rendering or image and corresponding mapping.

FIG. 2 is a high level flow chart illustrating an embodiment of a process for generating a two-dimensional rendering or image and corresponding mapping. Process 200 may be employed, for example, by graphics system 108 of FIG. 1. At step 202, a three-dimensional model is obtained. For example, the three-dimensional model may be obtained from a modeling engine of graphics system 108 or from storage or received from an external source. The three-dimensional model may comprise a model of an object or a scene comprising a plurality of objects. At step 204, a two-dimensional rendering or image and corresponding mapping is generated from the three-dimensional model obtained at step 202. For example, the two-dimensional rendering and corresponding mapping may be generated by a rendering engine of graphics system 108. The generated two-dimensional rendering or image comprises a prescribed perspective or view of a corresponding object or scene. In addition to the two-dimensional rendering, a corresponding mapping is also generated at step 204 that maps a potentially variable portion of the two-dimensional rendering to a texture, i.e., a client-side canvas. In some embodiments, step 204 furthermore includes identifying the potentially variable portion so that the mapping can be accordingly generated. The generated mapping is based on the three-dimensional model of the surfaces comprising the potentially variable portion so that surface contours and curvatures are preserved later when compositing according to the mapping. The mapping comprises a one-to-one mapping of pixels of a client-side canvas and pixels comprising the potentially variable portion of the generated two-dimensional rendering. In some embodiments, the mapping comprises a mapping of UV coordinates of the client-side canvas to UV coordinates of the two-dimensional rendering. The mapping generated at step 204 may be encoded. In some embodiments, step 204 furthermore comprises separately generating a rendering of a mapping encoded as pixel values. At step 206, the generated two-dimensional rendering and corresponding mapping are stored together, such as in database 110. Process 200 may be iterated to generate a dense set of views or perspectives of a given three-dimensional model and/or to populate database 110.

Figure 3:
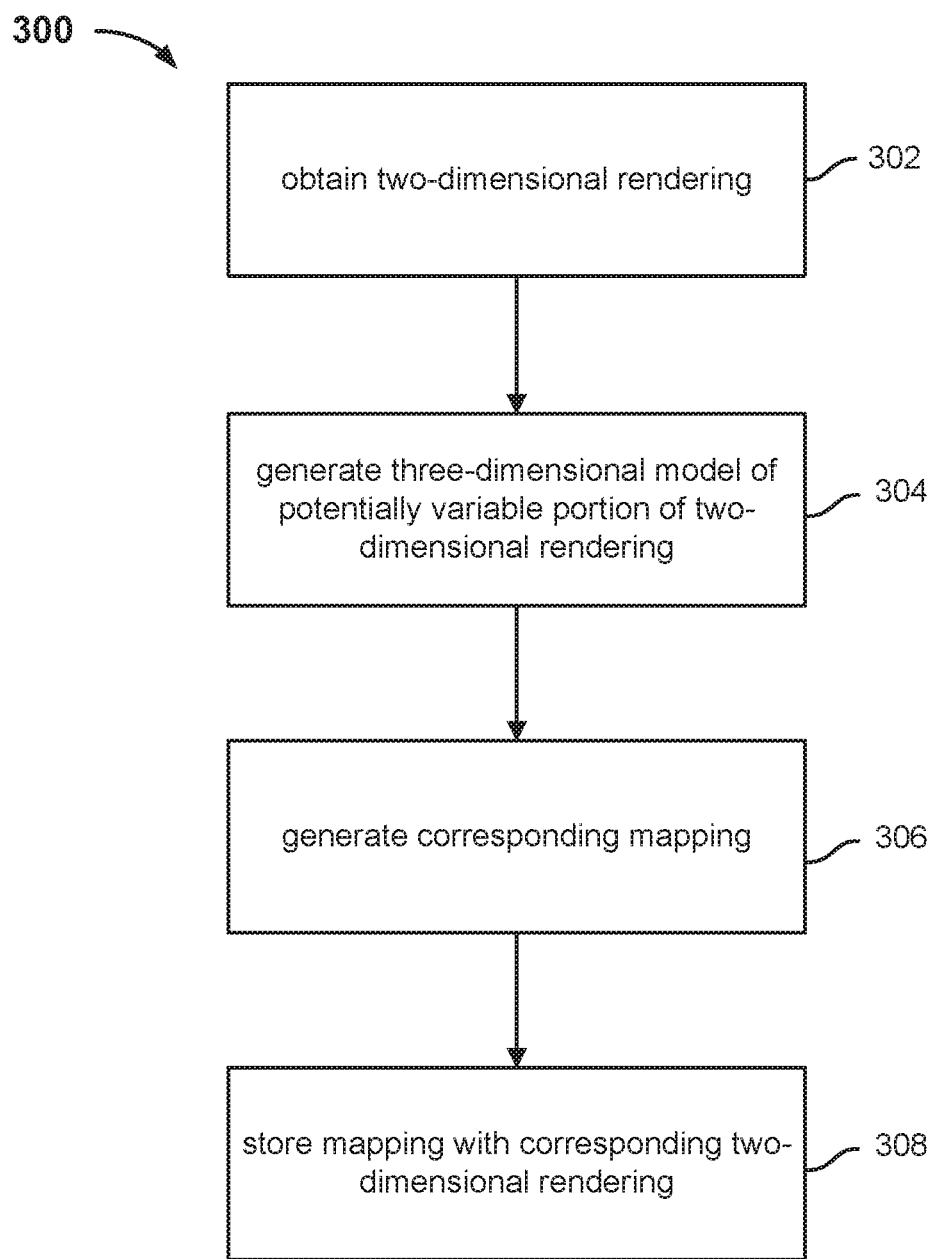
FIG. 3 is a high level flow chart illustrating an embodiment of a process for generating a mapping for a two-dimensional rendering.

FIG. 3 is a high level flow chart illustrating an embodiment of a process for generating a mapping for a two-dimensional rendering. Process 300 may be employed, for example, by graphics system 108 of FIG. 1. At step 302, a two-dimensional rendering or image is obtained. The two-dimensional rendering or image comprises a prescribed perspective or view of an object or a scene. For example, the two-dimensional rendering may be obtained from database 110 or from a rendering engine of graphics system 108 or received from an external source. The two-dimensional rendering comprises a pre-rendered image whose underlying three-dimensional model is not known or available for directly generating a corresponding mapping as in process 200 of FIG. 2. At step 304, a three-dimensional model of a potentially variable portion of the two-dimensional rendering is generated. For example, a three-dimensional polygon mesh model may be generated by a modeling engine of graphics system 108. In some embodiments, step 304 furthermore includes identifying the potentially variable portion of the two-dimensional rendering so that the three-dimensional model can be accordingly generated. The three-dimensional model generated at step 304 models the surface curvature of the potentially variable portion of the two-dimensional rendering. At step 306, a mapping corresponding to the potentially variable portion of the two-dimensional rendering is generated based on the generated three-dimensional model of the potentially variable portion. The mapping generated at step 306 maps a potentially variable portion of the corresponding two-dimensional rendering to a texture, i.e., a client-side canvas. The generated mapping is based on the three-dimensional model of the surfaces comprising the potentially variable portion so that surface contours and curvatures can be preserved later when compositing according to the mapping. The mapping comprises a one-to-one mapping of pixels of a client-side canvas and pixels comprising the potentially variable portion of the two-dimensional rendering. In some embodiments, the mapping comprises a mapping of UV coordinates of the client-side canvas to UV coordinates of the two-dimensional rendering. The mapping generated at step 306 may be encoded. In some embodiments, step 306 furthermore comprises generating a rendering of a mapping encoded as pixel values. Such a rendering of the mapping, for example, may be generated by a rendering engine of graphics system 108. At step 308, the generated mapping is stored with the corresponding two-dimensional rendering, such as in database 110.

Figure 4:
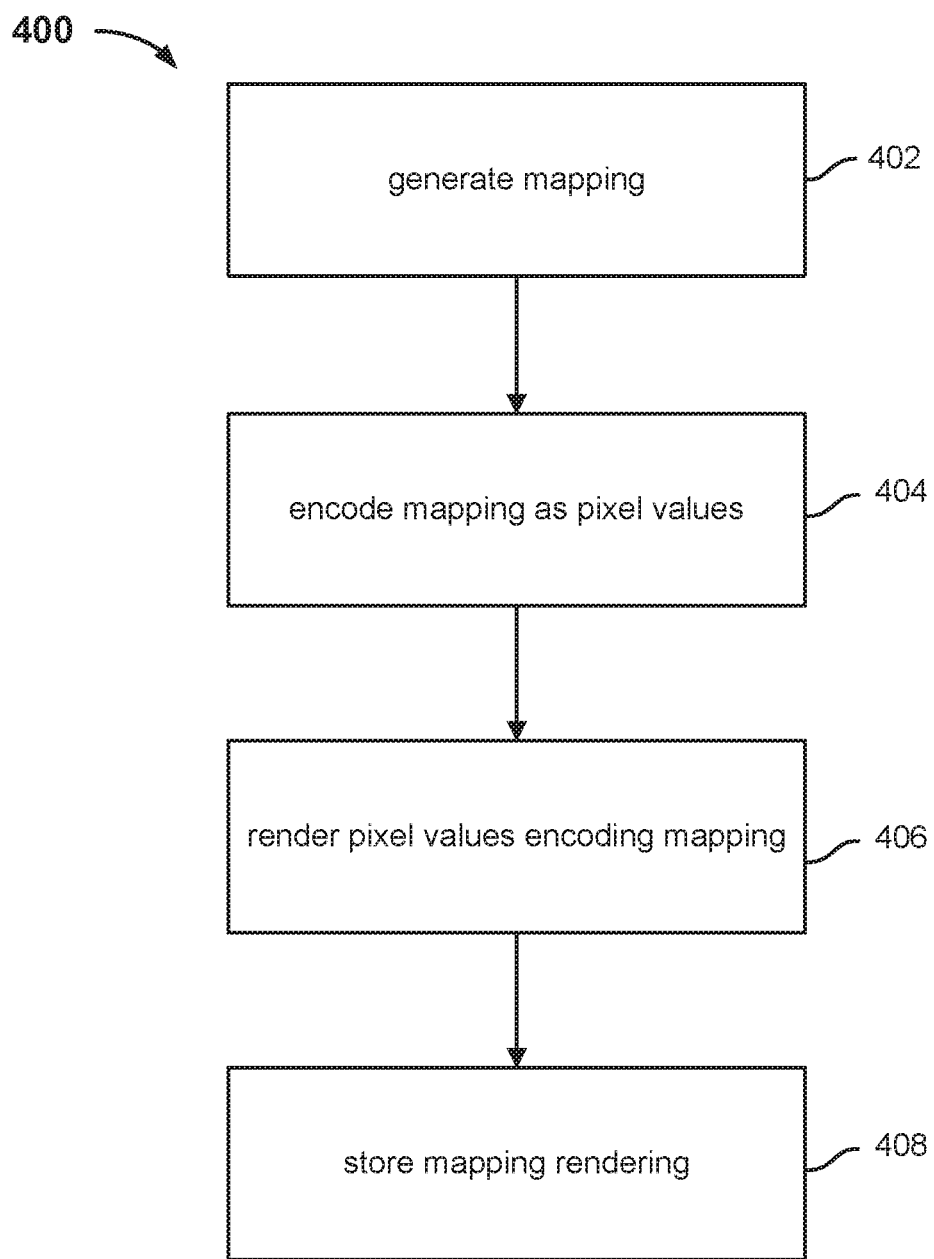
FIG. 4 is a high level flow chart illustrating an embodiment of a process for generating a two-dimensional rendering of a mapping encoded as pixel values.

FIG. 4 is a high level flow chart illustrating an embodiment of a process for generating a two-dimensional rendering of a mapping encoded as pixel values. Steps 402-406 of process 400 may be employed, for example, at step 204 of process 200 and step 306 of process 300. At step 402, a mapping is generated. For example, the mapping may be generated based on a known or generated three-dimensional model of a potentially variable portion of a two-dimensional rendering. In some embodiments, the mapping comprises a one-to-one mapping of UV coordinates of a client-side canvas and UV coordinates of a corresponding two-dimensional rendering. At step 404, the mapping generated at step 402 is encoded as pixel values. As one example, the UV coordinates of the potentially variable portion of the rendering may be encoded as color values, e.g., RGB values. In this example, for instance, given that each U and V coordinate comprises twelve bits and each of the RGB values of a pixel comprises eight bits, the R value of a pixel can be encoded as the top eight bits of the U coordinate, the G value of the pixel can be encoded as the bottom four bits of the U coordinate followed by the top four bits of the V coordinate, and the B value of the pixel can be encoded as the bottom eight bits of the V coordinate in one encoding scheme. In other embodiments, any other appropriate encoding scheme may be employed. At step 406, pixel values encoding the mapping are rendered to generate a two-dimensional rendering or image comprising the encoded mapping. At step 408, the mapping rendering is stored, e.g., in database 110, with a corresponding two-dimensional rendering such as at step 206 of process 200 and step 308 of process 300.

Figure 5:
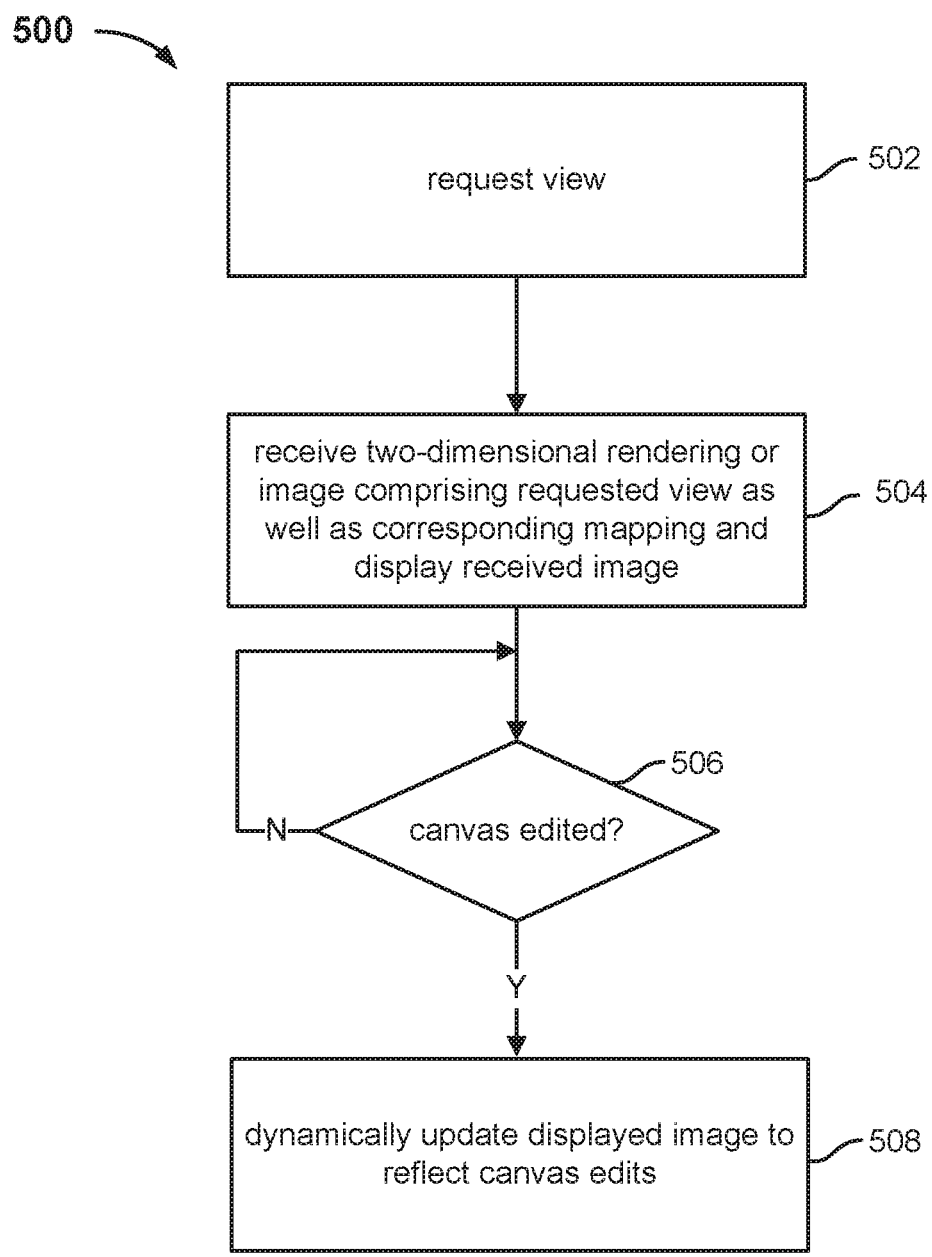
FIG. 5 is a high level flow chart illustrating an embodiment of a process for dynamically compositing custom content with respect to an image.

FIG. 5 is a high level flow chart illustrating an embodiment of a process for dynamically compositing custom content on an image. Process 500 may be employed, for example, by client 102 of FIG. 1. At step 502, a prescribed view of an object or scene is requested from a server such as server 104 of FIG. 1. The view may be requested at step 502 in response to an indication of interest or manipulation of an existing view by a user. At step 504, a two-dimensional rendering or image of the view requested at step 502 as well as a corresponding mapping is received from the server, and the received image is displayed at the client. In some embodiments, the image received and displayed at step 504 comprises a closest matching view, e.g., if an exact match of the requested view is not available at the server. At step 506, it is determined whether any edits are received with respect to a client-side canvas for specifying custom content that is composited on a potentially variable portion of the displayed image. If it is determined at step 506 that no edits have been received with respect to the canvas, the canvas is continued to be monitored for edits at step 506. If it is determined at step 506 that an edit has been received with respect to the canvas, the image or rendering received at step 504 that is currently displayed at the client is dynamically updated in real time according to the received mapping to reflect the edit at step 508. That is, step 508 comprises employing the received mapping to replace pixels of the displayed image with corresponding pixels of the canvas that have been specified or populated. Thus, user modifications of content on the canvas facilitate dynamic modifications of corresponding pixels of a currently displayed image in real time according to the associated mapping as the modifications are received from the user. In some embodiments, step 508 includes decoding the received mapping according to the encoding scheme employed for the mapping. For example, with respect to the aforementioned example, RGB pixel values of the mapping are decoded to UV coordinates of the potentially variable portion of the displayed image. Any one or more appropriate compositing techniques may be employed at step 508 to update corresponding pixels of the displayed image. In one example, the canvas and displayed image are treated as one-dimensional arrays, i.e., strings of bytes, rather than two-dimensional images, and a buffer array is employed to merge or blend a plurality of adjacent input (canvas) pixels for every output (displayed view) pixel in order to mitigate artifacts. In some cases, such a compositing technique quickly and efficiently generates output pixels in a single pass using a single nested loop.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
generating a mapping that maps a potentially variable portion of a two-dimensional rendering that is modifiable post rendering to a canvas, wherein the mapping is generated from a three-dimensional model of the potentially variable portion of the two-dimensional rendering; and
storing the generated mapping with the two-dimensional rendering;
wherein the mapping is provided with the two-dimensional rendering from a server to a client and the canvas is composited client-side on the potentially variable portion of the two-dimensional rendering according to the mapping so that pixels comprising content included on the canvas replace corresponding original pixels of the potentially variable portion of the two-dimensional rendering and in a manner that preserves curvatures of non-flat surfaces comprising the potentially variable portion of the two-dimensional rendering.

2. The method of claim 1, wherein edits on the canvas are composited in real time to dynamically modify the potentially variable portion of the two-dimensional rendering.

3. The method of claim 1, wherein the mapping comprises UV mapping.

4. The method of claim 1, wherein the canvas comprises a textured image.

5. The method of claim 1, wherein the canvas is editable and is used to specify or generate custom content.

6. The method of claim 1, wherein generating the mapping comprises encoding the mapping.

7. The method of claim 1, wherein generating the mapping comprises rendering an encoded version of the mapping.

8. A method, comprising:
receiving from a server a two-dimensional rendering and a mapping that maps a potentially variable portion of the two-dimensional rendering that is modifiable post rendering to a canvas, wherein the mapping is generated from a three-dimensional model of the potentially variable portion of the two-dimensional rendering;
displaying the received two-dimensional rendering;
receiving an edit on the canvas; and
modifying the displayed two-dimensional rendering client-side to reflect the received edit on the canvas by compositing the canvas on the potentially variable portion of the two-dimensional rendering according to the mapping so that pixels comprising content included on the canvas replace corresponding original pixels of the potentially variable portion of the two-dimensional rendering and in a manner that preserves curvatures of non-flat surfaces.

9. The method of claim 8, wherein empty portions of the canvas that do not include any content comprise transparent pixels that do not modify corresponding original pixels of the potentially variable portion of the two-dimensional rendering.

10. The method of claim 8, wherein the edit on the canvas dynamically modifies the displayed two-dimensional rendering in real time.

11. The method of claim 8, wherein the mapping comprises UV mapping.

12. The method of claim 8, wherein the canvas is editable and is used to specify or generate custom content.

13. The method of claim 8, wherein the canvas comprises a textured image.

14. The method of claim 8, wherein the received mapping is encoded.

15. The method of claim 8, wherein the mapping comprises a rendering of pixel values encoding spatial coordinates.

16. A system, comprising:
a processor configured to generate a mapping that maps a potentially variable portion of a two-dimensional rendering that is modifiable post rendering to a canvas, wherein the mapping is generated from a three-dimensional model of the potentially variable portion of the two-dimensional rendering; and
a database configured to store the generated mapping with the two-dimensional rendering;
wherein the mapping is provided with the two-dimensional rendering from a server to a client and the canvas is composited client-side on the potentially variable portion of the two-dimensional rendering according to the mapping so that pixels comprising content included on the canvas replace corresponding original pixels of the potentially variable portion of the two-dimensional rendering and in a manner that preserves curvatures of non-flat surfaces comprising the potentially variable portion of the two-dimensional rendering.

17. The system of claim 16, wherein edits on the canvas are composited in real time to dynamically modify the potentially variable portion of the two-dimensional rendering.

18. The system of claim 16, wherein the mapping comprises UV mapping.

19. The system of claim 16, wherein the canvas comprises a textured image.

20. The system of claim 16, wherein the canvas is editable and is used to specify or generate custom content.

21. The system of claim 16, wherein to generate the mapping comprises to encode the mapping.

22. The system of claim 16, wherein to generate the mapping comprises to render an encoded version of the mapping.

23. A system, comprising: a processor configured to:
receive from a server a two-dimensional rendering and a mapping that maps a potentially variable portion of the two-dimensional rendering that is modifiable post rendering to a canvas, wherein the mapping is generated from a three-dimensional model of the potentially variable portion of the two-dimensional rendering;
display the received two-dimensional rendering;
receive an edit on the canvas; and
modify the displayed two-dimensional rendering client-side to reflect the received edit on the canvas by compositing the canvas on the potentially variable portion of the two-dimensional rendering according to the mapping so that pixels comprising content included on the canvas replace corresponding original pixels of the potentially variable portion of the two-dimensional rendering and in a manner that preserves curvatures of non-flat surfaces; and
a memory coupled to the processor and configured to provide the processor with instructions.

24. The system of claim 23, wherein empty portions of the canvas that do not include any content comprise transparent pixels that do not modify corresponding original pixels of the potentially variable portion of the two-dimensional rendering.

25. The system of claim 23, wherein the edit on the canvas dynamically modifies the displayed two-dimensional rendering in real time.

26. The system of claim 23, wherein the mapping comprises UV mapping.

27. The system of claim 23, wherein the canvas is editable and is used to specify or generate custom content.

28. The system of claim 23, wherein the canvas comprises a textured image.

29. The system of claim 23, wherein the received mapping is encoded.

30. The system of claim 23, wherein the mapping comprises a rendering of pixel values encoding spatial coordinates.

31. A computer program product embodied in a non-transitory computer readable storage medium and comprising computer instructions for:
generating a mapping that maps a potentially variable portion of a two-dimensional rendering that is modifiable post rendering to a canvas, wherein the mapping is generated from a three-dimensional model of the potentially variable portion of the two-dimensional rendering; and
storing the generated mapping with the two-dimensional rendering;
wherein the mapping is provided with the two-dimensional rendering from a server to a client and the canvas is composited client-side on the potentially variable portion of the two-dimensional rendering according to the mapping so that pixels comprising content included on the canvas replace corresponding original pixels of the potentially variable portion of the two-dimensional rendering and in a manner that preserves curvatures of non-flat surfaces comprising the potentially variable portion of the two-dimensional rendering.

32. The computer program product of claim 31, wherein edits on the canvas are composited in real time to dynamically modify the potentially variable portion of the two-dimensional rendering.

33. The computer program product of claim 31, wherein the mapping comprises UV mapping.

34. The computer program product of claim 31, wherein the canvas comprises a textured image.

35. The computer program product of claim 31, wherein the canvas is editable and is used to specify or generate custom content.

36. The computer program product of claim 31, wherein generating the mapping comprises encoding the mapping.

37. The computer program product of claim 31, wherein generating the mapping comprises rendering an encoded version of the mapping.

38. A computer program product embodied in a non-transitory computer readable storage medium and comprising computer instructions for:
receiving from a server a two-dimensional rendering and a mapping that maps a potentially variable portion of the two-dimensional rendering that is modifiable post rendering to a canvas, wherein the mapping is generated from a three-dimensional model of the potentially variable portion of the two-dimensional rendering;
displaying the received two-dimensional rendering;
receiving an edit on the canvas; and
modifying the displayed two-dimensional rendering client-side to reflect the received edit on the canvas by compositing the canvas on the potentially variable portion of the two-dimensional rendering according to the mapping so that pixels comprising content included on the canvas replace corresponding original pixels of the potentially variable portion of the two-dimensional rendering and in a manner that preserves curvatures of non-flat surfaces.

39. The computer program product of claim 38, wherein empty portions of the canvas that do not include any content comprise transparent pixels that do not modify corresponding original pixels of the potentially variable portion of the two-dimensional rendering.

40. The computer program product of claim 38, wherein the edit on the canvas dynamically modifies the displayed two-dimensional rendering in real time.

41. The computer program product of claim 38, wherein the mapping comprises UV mapping.

42. The computer program product of claim 38, wherein the canvas is editable and is used to specify or generate custom content.

43. The computer program product of claim 38, wherein the canvas comprises a textured image.

44. The computer program product of claim 38, wherein the received mapping is encoded.

45. The computer program product of claim 38, wherein the mapping comprises a rendering of pixel values encoding spatial coordinates.

* * * * *